UNITED STATES PATENT OFFICE.

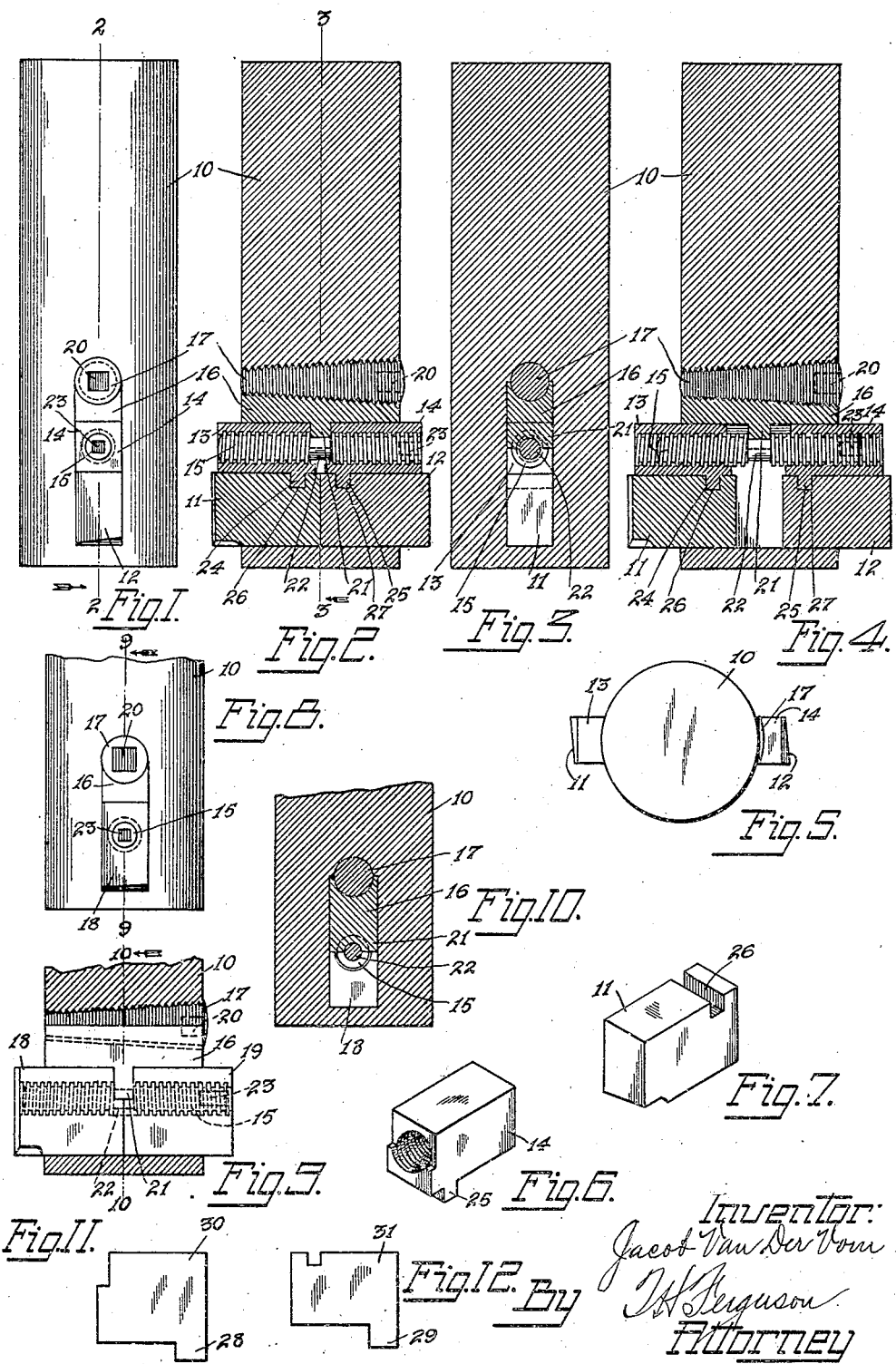

JACOB VAN DER VORN, OF CHICAGO, ILLINOIS, ASSIGNOR TO EXPANDEM TOOL AND MANUFACTURING COMPANY, A CORPORATION OF ILLINOIS.

BORING-TOOL.

1,251,140.  Specification of Letters Patent.   Patented Dec. 25, 1917.

Application filed June 18, 1917. Serial No. 175,285.

*To all whom it may concern:*

Be it known that I, JACOB VAN DER VORN, a citizen of the United States, residing at Chicago, county of Cook, State of Illinois, have invented certain new and useful Improvements in Boring-Tools, of which the following is a specification.

The present invention relates to boring tools for metal work, and particularly to boring tools of the expansion type, wherein the cutter-holding bar is provided with cutters which are adjustable toward and from the axis of the bar to vary the diameter of the cut.

The principal object of the invention is to provide improved means for supporting and adjusting the cutters in the bar with a view to bringing the cutters near the end of the bar while maintaining great rigidity of the cutters in all operative adjustments and at the same time readily obtaining the desired expansion adjustment for service. Other objects include economy and simplicity of construction, efficiency of operation at high speeds, and neatness and compactness of the parts.

The present invention is an improvement upon that disclosed in my Patent No. 1,232,411, granted July 3, 1917.

The invention will be best understood upon reference to the following detailed description taken in connection with the accompanying drawing, while the scope of the invention will be particularly pointed out in the appended claims.

In the drawing, Figures 1 to 7, inclusive, illustrate one embodiment of my invention; Figs. 8 to 10, inclusive, a second embodiment; and Figs. 11 and 12, modified forms of cutters.

Of these figures, illustrating the first form, Fig. 1 is a side elevation; Fig. 2 is a vertical section taken on a plane indicated by the line 2—2 of Fig. 1; Fig. 3 is a similar section taken on a plane indicated by the line 3—3 of Fig. 2; Fig. 4 a section similar to Fig. 2, illustrating the cutters in expanded position; Fig. 5 is an end view; Fig. 6 is a perspective view of one of the follower nuts; and Fig. 7 is a perspective view of one of the cutter blades.

Of the figures illustrating the second form, Fig. 8 is a side elevation; Fig. 9 is a vertical section taken on a plane indicated by the line 9—9 of Fig. 8; and Fig. 10 is a similar section taken on a plane indicated by the line 10—10 of Fig. 9.

Fig. 11 illustrates a modified form of cutter for use in the second form of the invention; and Fig. 12 illustrates a modified cutting blade for use in the first form of the invention.

Throughout these figures like characters refer to like parts.

Referring to the drawing in detail, the boring tool constituting the first form of the invention includes in brief a slotted cutter bar 10, cutters comprising blades 11, 12 and nuts 13, 14, an adjusting screw 15, a follower block 16, and a centering and clamping screw 17. In the second form of the invention the cutters 18 and 19 are somewhat different in construction. Each of these cutters comprises the cutting edge and the threaded bore for the adjusting screw 15 in one piece, instead of two pieces as in the first form. In other words, the parts 11 and 13 of the first form may be made integral and when so made result in the cutter 18 of the second form. Similarly the parts 12 and 14 when made integral produce the part 19.

As clearly illustrated, the conical clamping and centering screw 17 engages a conical thread formed in the upper wall of the slot through the bar 10. It also engages a similar conical thread formed in the upper face of the follower block 16. In the manufacture of the tool these conical threads are provided by first placing the block 16 in position in the slot and firmly holding it there while tapping out the conical opening in the adjacent wall of the slot and the coöperating block 16 into which the conical screw 17 is to fit. The latter is provided with a squared opening 20 for the reception of an adjusting key. The slot in both forms of the invention is made of such size that the parts fit snugly when once assembled. Because of this close fit the block 16 has to be quite accurately centered in the bar 10 in order for the threads upon the conical screw 17 to engage the proper threads upon the conical walls of the opening. Because of the accuracy of the fit of the threads upon the screw and upon these adjacent walls, it follows that if the adjustment established by hand be not mathematically accurate the threads will bring about a movement of the block 16 so as to cause the threads to fit together with mathematical accuracy and thereby absolutely center the block 16.

In both forms of the invention the block 16, which constitutes a clamping and centering element, is provided with a depending lug 21, which is cut away on its under side so as to provide a curved surface, as clearly illustrated in Figs. 3 and 10, which will fit upon the neck 22 of the adjusting screw 15. As clearly illustrated, the screw 15 is provided with oppositely disposed threads which are cut upon the enlarged end portions of the screws; and the neck 22, which is in fact a reduced portion, lies between these end portions at the center of the screw. The lug 21 is of sufficient width to bear against the adjacent faces of the enlarged end portions of the screw and consequently the screw is accurately centered whenever the block 16 is centered. The screw 15 is provided with a squared opening 23 for the use of a key to rotate it to bring about desired adjustments of the cutters.

In the form of the invention illustrated in Fig. 1 the oppositely disposed threads upon the adjusting screw 15 engage corresponding oppositely disposed threads in the nuts 13 and 14. As a result of this arrangement rotations of the screw 15 will bring about movements of the nuts 13 and 14 toward and from each other according to the direction of rotation of the screw. The nuts 13 and 14 are provided with projections 24 and 25, respectively, which engage slots 26 and 27 in the upper edges of the cutters 11 and 12, respectively. These projections fit the slots tightly so that the movement of each nut is transmitted to the associated cutter blade. In other words, the nuts and blades move together, one nut and its blade moving as a single unit and the other nut and its blade moving as a second unit.

In the second form of the invention, wherein the nuts and cutter blades are made of a single piece, the cutters 18 and 19 are adjusted to and fro by the rotations of the adjusting screw 15.

In assembling the parts the follower block 16 and the associated cutters, whether of the two-part structure of the first form of the invention, or the integral structure of the second form, are assembled together and then moved into the slot of the bar 10. When moved by hand into a position as near central as possible, then the conical screw 17 is put in place and given a small rotary movement, enough to center the threads and bring all the parts into a central position, and at the same time press down upon the block 16 with sufficient force to securely clamp all the parts together.

Where it is desired to have the cutting edge of the cutters come flush with the end of the bar 10, the cutters may be made with a depending portion 28 or 29, as illustrated in Figs. 11 and 12, wherein the cutter 30 of Fig. 11 is made the same as cutter 19, except that it has the depending portion 28, and the cutter 31 is made the same as cutting blade 12, except that it has the depending portion 29.

It will be apparent that in carrying out the invention the bar 10 may be provided with two or more slots, if desired, and each slot provided with its complement of cutters and associated parts. Such changes may be made as are covered by the scope of the appended claims.

It is also noted that my co-pending application, Serial No. 175,284, filed June 18, 1917, for an improvement in boring tools, contains claims which broadly cover the invention which is specifically covered by the claims herein.

What I claim as new and desire to secure by Letters Patent of the United States is:

1. A boring tool including a main bar provided with a transverse slot, a pair of adjustable cutters in said slot resting along one edge against a wall of said slot, following means engaging the other edge of said cutters and operative to apply pressure throughout practically the entire length of said edge, and a conical clamping screw coöperating between a threaded wall of said slot and said following means to force said following means against said cutters to hold them firmly in position.

2. A boring tool including a main bar provided with a transverse slot, a pair of adjustable cutters in said slot resting along one edge against a wall of said slot, following means engaging the other edge of said cutters and operative to apply pressure throughout practically the entire length of said edge, a conical clamping screw coöperating between a threaded wall of said slot and said following means to force said following means against said cutters to hold them firmly in position, and a transverse oppositely threaded screw for adjusting said cutters and when released by said clamping screw.

3. A boring tool including a main bar provided with a transverse slot, a conical clamping screw, engaging threads formed in one wall of said slot and having a length practically equal to that of the width of said bar, a follower block having threads for coöperative engagement with said screw, said block being located in said slot and having a length practically equal to the width of said bar, a centering projection on said block, an adjusting screw having a central neck engaged by said projection and enlarged oppositely threaded portions outward of said neck, and a pair of cutters in said slot having oppositely threaded openings coöperating with said threaded portions of said adjusting screw.

In testimony whereof I have hereunto subscribed my name this 15th day of June, A. D. 1917.

JACOB VAN DER VORN.

Copies of this patent may be obtained for five cents each, by addressing the "Commissioner of Patents, Washington, D. C."

Correction in Letters Patent No. 1,251,140.

It is hereby certified that in Letters Patent No. 1,251,140, granted December 25, 1917, upon the application of Jacob Van Der Vorn, of Chicago, Illinois, for an improvement in "Boring-Tools," an error appears in the printed specification requiring correction as follows: Page 2, line 121, claim 2, strike out the word "and;" and that the said Letters Patent should be read with this correction therein that the same may conform to the record of the case in the Patent Office.

Signed and sealed this 5th day of February, A. D., 1918.

[SEAL.]

R. F. WHITEHEAD,
*Acting Commissioner of Patents.*

Cl. 77—58.